US008078922B2

(12) United States Patent
Yordanov et al.

(10) Patent No.: US 8,078,922 B2
(45) Date of Patent: Dec. 13, 2011

(54) INTERNAL SERVER ERROR ANALYSIS

(75) Inventors: Diyan Yordanov, Varna (BG); Violeta Georgieva, Sofia (BG); Polina Genova, Veliko Tarnovo (BG); Maria Jurova, Sofia (BG)

(73) Assignee: SAP AG, Walldorf (DE)

( * ) Notice: Subject to any disclaimer, the term of this patent is extended or adjusted under 35 U.S.C. 154(b) by 60 days.

(21) Appl. No.: 12/571,094

(22) Filed: Sep. 30, 2009

(65) Prior Publication Data

US 2011/0078519 A1 Mar. 31, 2011

(51) Int. Cl.
G06F 11/00 (2006.01)
(52) U.S. Cl. ............... 714/57; 714/4.1; 714/39; 714/42; 714/48; 714/49
(58) Field of Classification Search ................ 714/4, 42, 714/48, 57, 4.1, 39, 49
See application file for complete search history.

(56) References Cited

U.S. PATENT DOCUMENTS

| | | | |
|---|---|---|---|
| 6,594,697 B1 * | 7/2003 | Praitis et al. ................... | 709/225 |
| 7,490,347 B1 | 2/2009 | Schneider et al. | |
| 7,739,551 B2 * | 6/2010 | Eickmeyer et al. ............. | 714/38 |
| 2003/0131005 A1 * | 7/2003 | Berry .............................. | 707/10 |
| 2006/0047755 A1 | 3/2006 | Jurova | |
| 2006/0200450 A1 * | 9/2006 | Keane et al. ...................... | 707/3 |
| 2007/0033264 A1 * | 2/2007 | Edge et al. ..................... | 709/217 |
| 2008/0163267 A1 | 7/2008 | Jurova et al. | |
| 2008/0209273 A1 * | 8/2008 | Bahl et al. ........................ | 714/37 |
| 2008/0270992 A1 | 10/2008 | Georgieva et al. | |

* cited by examiner

*Primary Examiner* — Charles Ehne
(74) *Attorney, Agent, or Firm* — Fish & Richardson P.C.

(57) ABSTRACT

The present disclosure involves systems, software, and computer implemented methods for internal server error analysis. One process includes operations for identifying an internal server error associated with a particular type of error and returned by a web container. A counter of the number of internal server errors returned by the web container is incremented. The internal server error is also associated with an internal categorization of the particular type of internal server error, and the occurrence of the internal server error is added to a categorization entry generated based on the internal categorization of the error.

21 Claims, 3 Drawing Sheets

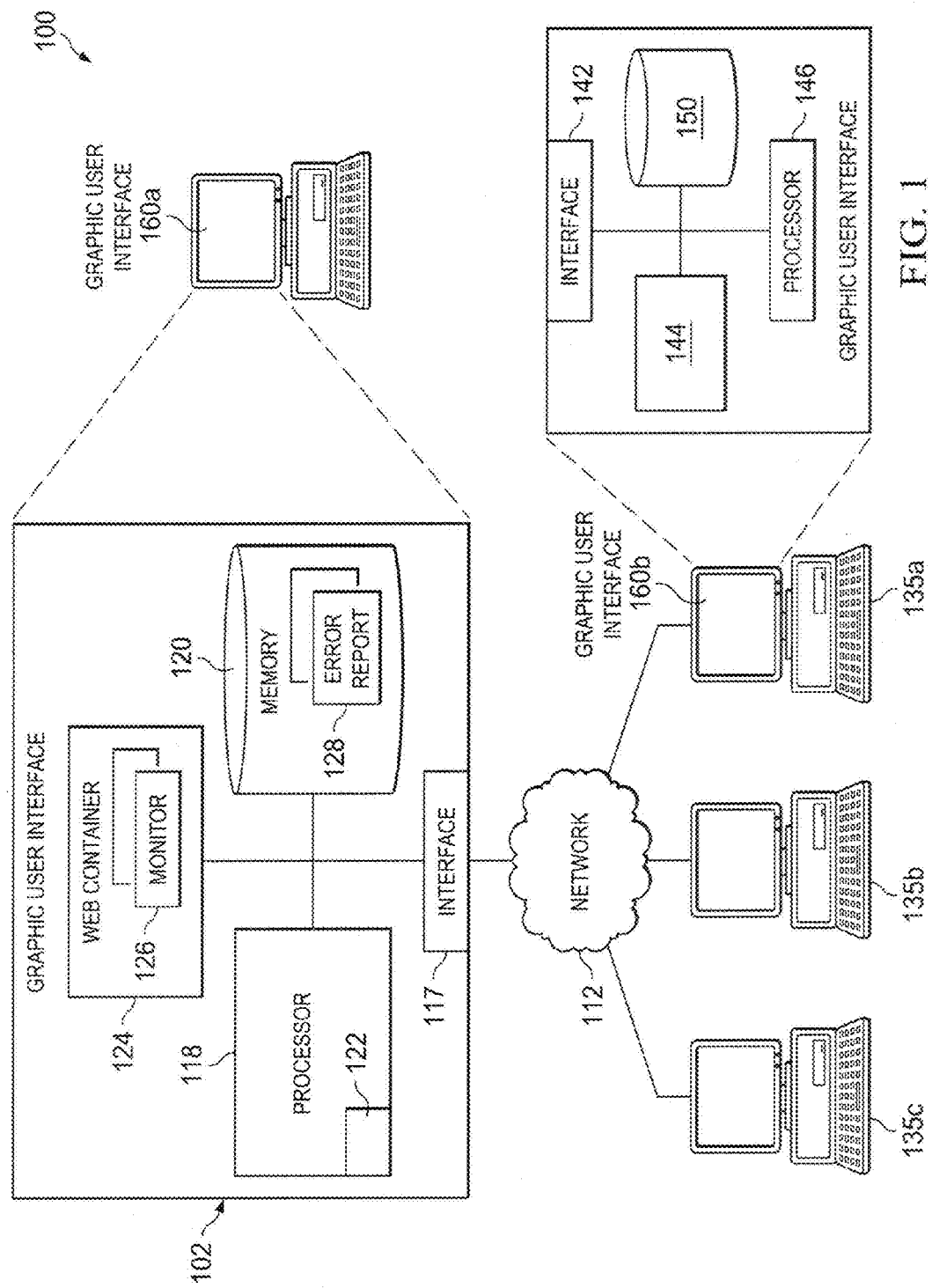

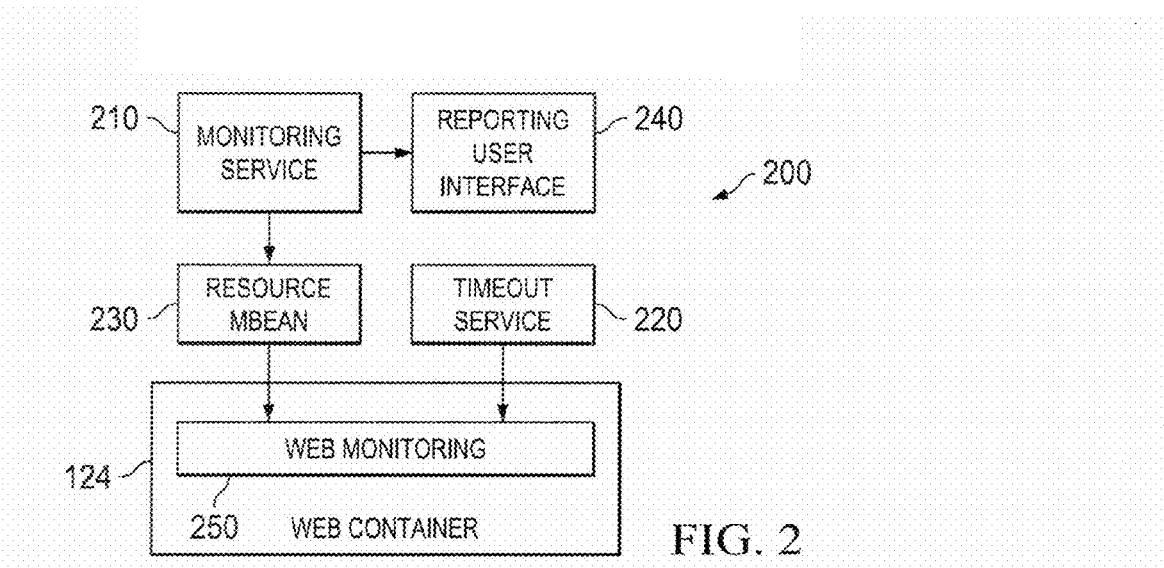

FIG. 2

```
Time when error happened = 2009 07 23 17:37:32:844 [1248363452844]
Log ID = 0050569E631D008C00000000000008DC
Log ID ISE 500 = 0050569E631D008C00000003000008DC
Message ID = com.sap.ASJ.web.000326
DC name = BC
CSN component = BC End-User's description and categorization of the problem:
test Client ID = 285
Client IP = 10.55.71.103
Host name = default Context root = EndUserProblemReportingTest
Application name = JavaEE/EndUserProblemReportingTest
Web application root directory = D:\usr\sap\LKG\J00
\j2ee\cluster\apps\JavaEE\EndUserProblemReportingTest\servlet_jsp\EndUserProblemReportingTest\root Application session:
 - User Name = Administrator
 - ID = vBQo-9vqjvQsiKtXt2WVZ4WMCfZaFvinIgGKtzEA_SAP
 - Creation time = 2009 07 23 17:37:32:812 [1248363452812]
 - Last access time = 2009 07 23 17:46:36:297 [1248363996297]
 - Expiration date = 2009 07 23 18:16:36:297
 - Is sticky = true
 - Attributes:
```

FIG. 4

INTERNAL SERVER ERROR ANALYSIS

TECHNICAL FIELD

The present disclosure relates to software, computer systems, and computer implemented methods for internal server error analysis.

BACKGROUND

In a server-client system, a client may transmit a HyperText Transfer Protocol (HTTP) request to a web server requesting content comprising a web page or other data. The web server may encounter an unexpected condition preventing the web server from fulfilling the client HTTP request for access to content stored on the web server or access to a particular Uniform Resource Locator (URL). If the web server is unable to resolve the unexpected condition, the web server may generate a generic error message such as an Internal Server Error 500. Further, the web server may generate an internal error log, which notes the occurrence of internal errors. A web administrator may search the entire internal error log to identify and address a web server problem. As such, the situations leading to the internal errors would be analyzed and proactively monitored for identification of problems within the web server.

SUMMARY

The present disclosure provides techniques for monitoring, analyzing, and reporting internal server errors. A computer program product is encoded on a tangible storage medium, where the product comprises computer readable instructions for causing one or more processors to perform operations. These operations can include identifying an internal server error returned by a web container and associated with a particular type of error. A counter of the number of internal server errors returned by the web container is incremented. The computer program product can further launch, implement, store, or otherwise execute operations such as adding the occurrence of the internal server error to a categorization entry, which is generated based on an internal categorization of the particular type of error.

Various implementations can include the following features. For example, the techniques can also include generating an error report of the internal server error. The error report can comprise the internal categorization of the internal server error, the source of the internal server error, or a possible solution to the internal server error. Further, the error report may be generated if an error report was not previously generated for the particular type of error.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 illustrates an example environment implementing various features of the internal server error analysis within the context of the present disclosure;

FIG. 2 is a diagram illustrating the communication and interaction between error analysis components of an appropriate system, such as the system described in FIG. 1;

FIG. 4 is an example expert report generated using an appropriate system, such as the system described in FIG. 1.

DETAILED DESCRIPTION

Figure 3:
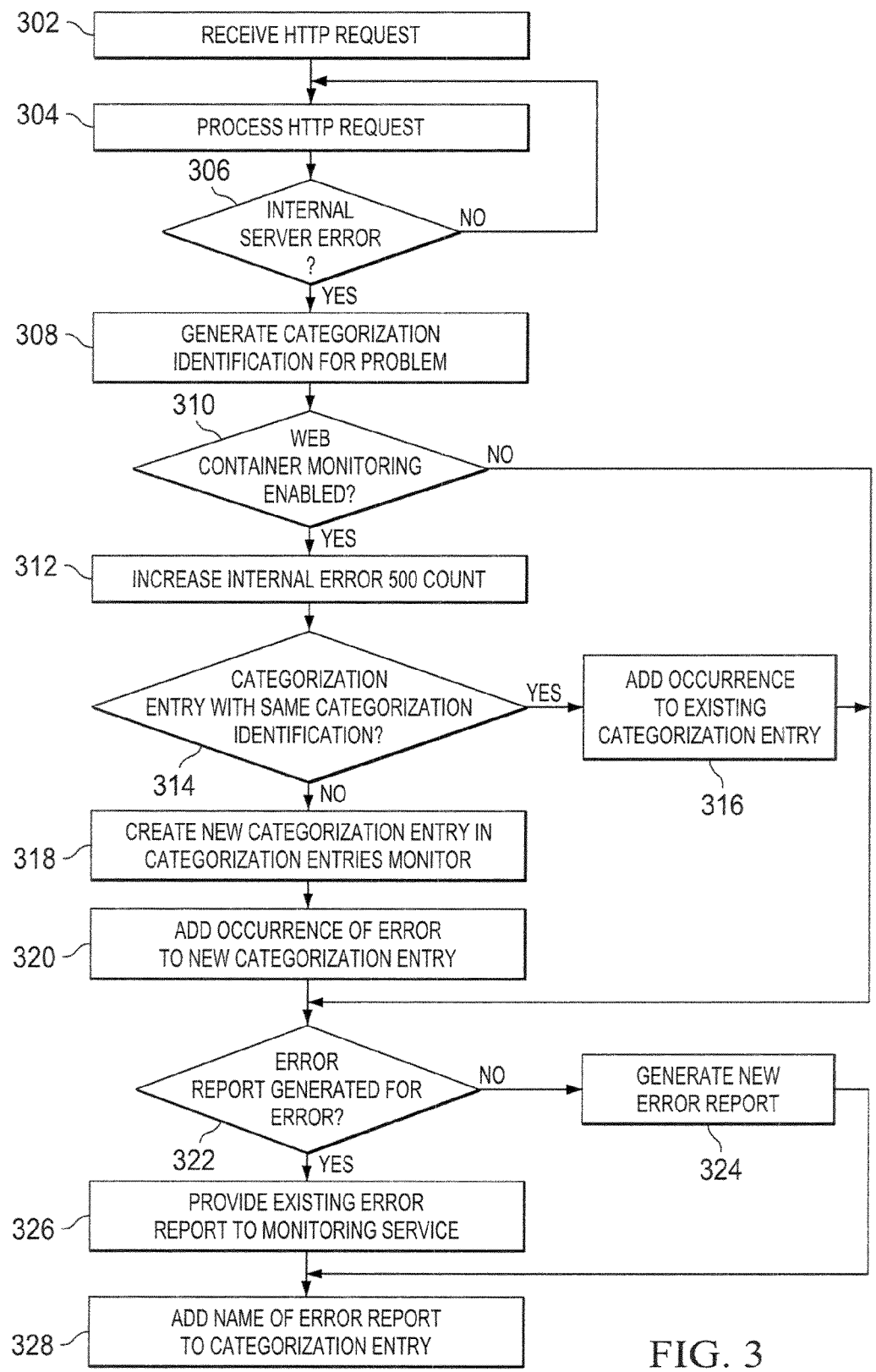
FIG. 3 is a flow chart of an example internal server error analysis process using an appropriate system, such as the system described in FIG. 1.

This disclosure generally describes computer systems, software, and computer implemented methods for monitoring and analyzing internal server errors. In certain implementations, monitoring utilities are used to assist the end user, such as a system administrator, for example, in detecting, identifying, and solving different root problems that have resulted in an internal server error. In a web server environment, an internal server error may occur when an unexpected condition prevents the web server from fulfilling a client HyperText Transfer Protocol (HTTP) request for access to content stored on the web server or access to a particular Uniform Resource Locator (URL). The web server may generate an internal server error notification, informing the end user that an internal server error has occurred. The error may be a generic internal server error, and a generic internal server error notification is generated because a specific error message may be unsuitable in some instances. In certain implementations, the generic internal server error is described as an Internal Server Error 500. Although an internal server error log can be maintained by the web server to log the occurrence of each internal server error, the error log does not indicate the source, location, frequency or other data associated with the internal server error. Monitoring utilities can be implemented under these circumstances to enable the end user to track the most common problems that result in an internal server error or to inform the end user of the status of the system through an indicator. Specifically, the monitoring utilities can maintain a count of the occurrences of internal server errors or implement unique identifiers for certain types of server problems to keep statistics of categorization entries generated as a result of internal server errors.

One potential benefit of such techniques is that the monitoring utilities facilitate efficient identification, analysis, and correction of internal server errors. Many components within a web server or a web container service have the capability to throw errors specific to the component. Further, some components or specific errors associated with the components are not easily classified, and the occurrence of an internal server error in connection with such components results in a generic Internal Server Error 500 that gives no indication of which component generated the error. To identify and remedy the situation giving rise to the error, the system administrator is required to manually locate the error in the internal server error log and address any problems based only on the record in the error log. In systems with complex arrangements of components, the system administrator may not be able to identify and fix an error quickly based only on the error log. In some instances, the internal server error log contains only information indicating that an internal server error has occurred but does not provide the root cause of the problem. Other limitations of the internal server error log can include lack of a message identifier, lack of a correlation identifier, or an incompatible format of the error log. Further, internal server errors are recorded in the server logs without a pattern that can be used for monitoring and categorization. Accordingly, the monitoring utilities of the present disclosure alert the system administrator of internal server errors and provide the necessary data for the system administrator to track and address the problems giving rise to the internal server errors.

Turning to the illustrated example, FIG. 1 illustrates an example environment 100 for monitoring and analyzing internal server errors. The illustrated environment 100 includes or is communicably coupled with server 102 and one or more clients 135, at least some of which communicate across network 112. In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server, where the hosted applications 122 represent one or more web-based applications accessed and executed via network 112 by the clients 135 of the system to perform the programmed tasks or operations of the hosted application 122. At a high level, the server 102 comprises an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 122, and sending the appropriate response from the hosted application 122 back to the requesting client application 144. In addition to requests from the external clients 135 illustrated in FIG. 1, requests associated with the hosted applications 122 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, and one or more hosted applications 122. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to intuitively monitor, view, and request data associated with internal server errors such as an error report 128 generated by web container 124. The GUI 160a is often configurable, supports a combination of tables and graphs (bar, line, pie, status dials, etc.), and is able to build real-time portals, where tabs are delineated by key characteristics (e.g. site or microsite). Therefore, the GUI 160a contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and the clients 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

The illustrated environment of FIG. 1 also includes one or more clients 135. Each client 135 may be any computing device operable to connect to or communicate with at least the server 102 and/or via the network 112 using a wireline or wireless connection. Further, as illustrated by client 135a, each client 135 includes a processor 146, an interface 142, a graphical user interface (GUI) 160b, a client application 144, and a memory 150. In general, each client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of the clients 135 through the display, namely, the GUI 160b. As indicated in FIG. 1, client 135c is specifically associated with an administrator of the illustrated environment 100. The administrator 135c can modify various settings associated with one or more of the other clients 135, the server 102, the hosted application 122, and/or any relevant portion of environment 100. For example, the administrator 135c may be able to modify the relevant timeout values associated with web container 124 or each hosted application 122, as well as any web container 124 or hosted application settings, including those associated with error monitors 126. The administrator of the illustrated environment may also execute changes to server 102 directly at the server, using GUI 160a, for example. In the present disclosure, the terms "administrator" and "end user" may be used interchangeably as appropriate without departing from the scope of this disclosure.

Server 102 may also include a web container 124, which is a container executed by server 102 that can provide runtime environment services such as life-cycle management, security, concurrency, and deployment to web components on server 102. In particular, web container 124 can provide a runtime environment for hosted application 122. The hosted application 122 may be running in connection with a proprietary web application user interface technology or through a portal framework, while the web container 124 is the component of server 102 that receives requests from a client application 144. Specifically, an HTTP provider of the web container 124 receives a request from a client application 144. Thus, the web container 124 possesses all information about every HTTP request received at server 102 and is configured to display the information for the HTTP requests in GUI 160a or at a computer, such as client 135, connected to the server 102 through network 112. The information related to the HTTP requests includes information associated with possible internal server errors. Monitoring utilities 126 can be implemented within web container 124 for identifying information associated with internal server errors. In particular, internal server errors are associated with particular components in the web container 124, and services such as a monitoring service and timeout service may need to access monitoring utilities 126 to obtain information related to the internal server errors associated with particular components in order to execute tasks and properly display the information to a user.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122. Further, memory 120 may store data objects associated with internal server errors such as error reports 128 generated by web container 124. Still further, memory 120 may include any other appropriate data, such as VPN applications, firmware logs and policies, HTML files, data classes or object interfaces, unillustrated software applications or sub-systems, firewall policies, a security or access log, print or other reporting files, as well as others.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIG. 2 is a diagram illustrating the communication and interaction between the web container 124, a monitoring service 210, and a timeout service 220 of an example embodiment of the present disclosure. In general, the web container 124 of the present disclosure provides a service property to standard applications such as Java EE Web Applications, web development tools, or portal frameworks, for replacing the global default error handling mechanism. In certain implementations, the internal server error monitoring process uses monitoring utilities to facilitate the end user or administrator in detecting, identifying, and solving different root problems that give rise to situations resulting in an Internal Server Error 500. The monitoring utilities can include two monitors 126: an internal server error counter and internal server error categorization entries. The monitors 126 may have values stored in a web monitoring class 250, which is logically defined within the web container 124 and implements the monitoring interface. In the web monitoring class 250, the values of the monitors 126 are regularly updated and recalculated after each occurrence of an Internal Server Error 500. These monitors 126 enable the end user to easily track the most common problems and to remain aware of the current status of the system through various indicators associated with the monitors 126.

The first monitor is a monitor or counter that counts the number of Internal Server Errors 500 that are returned by the web container 124 regardless of the cause or type of the error. It is used to collect the most up-to-date number of internal server errors and provide the number of errors to the monitoring service 210. The counter can be configured to begin the count of the number of internal server errors when the web container 124 is initialized. Under normal operations, the counter should ideally be zero, and the monitoring service 210 can be configured to alert the end user when the counter has a non-zero value. Of course, the counter may be formatted and/or stored as any suitable data structure that facilitates monitoring the existence of errors, the passing of a certain threshold, or violation of some default or configured filter.

The second monitor, generally referred to as Error 500 Categorization Entries, maintains statistics of categorization entries generated as a result of internal server error situations handled by the web container 124. Each categorization entry represents a particular problem that has resulted in an internal server error. Further, the categorization entries are generated based on an internal categorization of problems, which can comprise calculation of a unique identifier for each problem that occurs. The unique identifier, which can be referred to as an internal categorization ID, can be based on a hashcode of (1) throwable hashcode, (2) a message ID for the problem, (3) development components, (4) components responsible for messages associated with particular components in the system, (5) the context root, and (6) the name of the application. The unique identifier or categorization ID can be assigned to problems sharing a particular set of characteristics. For example, occurrences of problems that share the same web publication, message identification, associated component, or other attributes, are categorized using the same categorization ID because problems that share the set of characteristics are actually instances of the same problem. Accordingly, in certain implementations, the categorization ID is used to generate an error report 128 only for the first occurrence of problems sharing a categorization ID as opposed to generating an error report 128 for each error that arises. Further, the categorization ID can assist the end user in identifying and fixing the errors that occur most frequently. Like above with the first monitor, the second monitor may be formatted and/or stored as any suitable data structure.

The categorization entry for each problem can include the categorization ID for the problem, the number of occurrences of the same problem, and the names of the error report files generated for the problem, if these error reports exist. The information in the categorization entry can be presented in a table monitor where the entries are sorted in a particular order. In other words, the information associated with the internal server errors are collected in one data object by the second monitor. Thus, in this example, the first monitor is a counter of all internal server errors while the second monitor separates the errors into different entries, maintains statistics associated with the errors, and treats instances of the same error as one internal server error.

In some implementations, the two monitors 126, the internal server error counter and the categorization entries, can be implemented by including two fields within the web monitoring class 250 in the web container 124. A field associated with the internal server error count can be defined using a thread-safe AtomicLong field in the web monitoring class. An AtomicLong value is an atomic variable that may be updated atomically. Atomic variables can be used to implement counters in Java and to prevent thread interference without resorting to synchronization techniques. Other types of variable can be used in place of the AtomicLong field for implementing the internal server error counter, however, and the scope of the present disclosure includes any variable suitable for use as a counter, including variables associated with synchronized techniques. The internal server error counter holds the current number of internal server errors thrown by the web container 124, and with each occurrence of an internal server error, the counter is increased by one. The value of the counter can be obtained by the monitoring service 210 at regular intervals for reporting or presentation to the end user.

The second monitor, the categorization entries, can be implemented in a thread-safe ConcurrentHashMap object that contains specific information about internal server error occurrences. The ConcurrentHashMap data structure is a hash map that contains highly concurrent properties such as minimal amounts of synchronization and locking. The scope of the present disclosure, however, includes data structures of other types as well. In certain implementations, each key in the categorization entries data structure is a categorization ID of one type of internal server error. A corresponding data structure associated with the categorization entries field can be defined to encapsulate information that should be mapped to the categorization ID, such as, for example, the number of occurrences of errors with a particular categorization ID and the file names of the error reports generated for the given categorization ID. When a new error occurs, if a categorization entry does not exist for the categorization ID of the error, the newly calculated categorization ID can be added to the categorization entry data structure. If a categorization entry with the same categorization ID already exists, a record of the number of occurrences of errors with the same categorization ID is increased. The value of the categorization entries monitor can be obtained by the monitoring service 210 at regular intervals.

The monitoring service 210 is responsible for collecting information related to particular functions of the monitoring utilities from possible sources and presenting the information through a Reporting User Interface (UI) 240, which is any monitoring tool that presents information to the end user. The Reporting UI 240 can be viewed at a client computer, at the server by an end user, or at a web-addressable location. The Reporting UI 240 can be updated on a periodic basis after a specified time when the monitoring service 210 collects updated information from the web container 124 regarding internal server error monitoring. In other words, at configurable intervals, the monitoring service 210 obtains the most current values of the monitoring utilities from the web container 124 and updates the Reporting UI 240 tools. In certain implementations, the configurable interval between monitoring service updates is defined such that the possibility of excessive system congestion is minimized. The monitoring service 210 can also obtain information from the web container 124 upon request from an end user, and the Reporting UI 240 can be updated if there are new values from the web container 124.

The monitoring service 210 may use a resource such as a Java object to obtain the values and attributes of the monitoring utilities from the web container 124. In the illustrated embodiment, the monitoring service 210 utilizes a Resource Managed Bean (MBean) 230 for pulling information associated with internal server errors from the web container 124. An MBean is a Java object or a reusable software component that represents a manageable resource. In some implementations, various tools of web applications and web services can easily locate the Resource MBean 230 and retrieve error monitoring information. Alternatively, monitoring service 210 may access information from the web container 124 directly or through other means.

A timeout service 220 can also be implemented, which regularly clears the internal server error monitors at configurable intervals. In order to maintain consistent and up-to-date information, the internal server error monitors 126 should be cleared simultaneously and at regular intervals. Accordingly, the web container 124 is integrated with the timeout service 220 to perform regular cleanup of the monitors 126. In certain implementations, the integration of the timeout service 220 can be based on an implementation of a TimeoutListener interface by the web monitoring class 250. Thus, when a predefined timeout period expires, the web monitoring listener is notified through a timeout method. The web monitoring class 250 then traces the content of the monitors 126 and clears them from memory. This prevents storage of outdated information about internal server errors and ensures that the monitoring service 210 continues to pull updated information from the web container 124. The interval between clearing of internal error monitors 126 can have a default value, such as every twenty four hours. The interval can also be defined to have a shorter or longer value. In some implementations, the interval can be configured to alternate or vary at certain times, or the timeout service 220 can be switched off so that the monitors 126 are not cleared. In other words, the timeout service 220 can be used by an administrator to either automatically or manually clear the monitors 126, or the timeout service 220 may not be used. A command that clears the monitors 126 may also be used in conjunction with the timeout service 220. Thus, after an administrator is notified by the monitors 126 of a problem giving rise to an internal server error, the administrator can address the problem and clear the monitors 126 without restarting the system. Once the information is cleared from the monitors 126, the information is generally inaccessible, although data that has been previously cleared may be accessed or visible later, such as during execution of an internal server error trace.

FIG. 3 is a flow chart depicting an example internal server error analysis process of the present disclosure. First, a web container 124 receives an HTTP request from a client 135 at 302. The web container 124 processes the HTTP request to generate a response or responsive content for the client 135 at 304. Processing the HTTP request may comprise, for example, invoking an application, generating multiple child threads for asynchronous processing of the HTTP request, or obtaining responsive content from various content providers. The processing of the HTTP request continues under normal operations until completion, but in some instances, an unexpected condition may prevent the web container 104 from fulfilling the HTTP request. If a problem arises during processing of the HTTP request, an internal server error may be generated at 306, and a categorization ID is generated for this instance of the internal server error at 308. The categorization ID is generated based on an internal classification of the error and prevents redundant generation of error reports for the same type of problems.

If the error monitoring mechanism in the web container 124 is enabled at 310, the error monitors 126 in the web container 124 will be updated. Here, the error monitoring mechanism may be enabled by default, or, the error monitoring mechanism may also be manually disabled, resulting in no updating of monitors 126 with the runtime errors. If the error mechanism is enabled, however, the internal server error count monitor is incremented at 312 to track the number of internal server errors that have occurred. Next, if there is already a categorization entry in the categorization entries monitor with the same categorization ID at 314, the occurrence of the error is added to the existing categorization entry with the same categorization ID in the categorization entries monitor at 316. If a categorization entry associated with the same categorization ID as the error does not exist, a new categorization entry is created in the categorization entries monitor at 318 and the specific occurrence of the error is added to the new categorization entry at 320. Thus, the entries within the categorization entries monitor allow the web container 124 to provide the most frequent errors to the monitoring service 210, for example. Once the internal server error count monitor and the categorization entries monitor have been updated, the error monitoring mechanism determines whether an error report 128 for the error has been generated for at 322. If an error report 128 has not been generated, a new error report 128 is generated by the web container 124 at 324. Alternatively, a new report may also be generated at 324 if the previous error report's validity period has already expired. If an error report 128 has already been generated, then the existing error report 128 is provided to the monitoring service 210 at 326. Finally, the name of the generated error report 128 is added to the categorization entry for the error in the categorization entries monitor at 328.

An example error report 128 is depicted in FIG. 4. The error report 128, whether it is an existing or newly generated report, can be given to a user upon request from the user through the monitoring service 210. In some implementations, the error report 128 can contain information about a particular error such as the categorization ID, the source of the error, possible solutions to the problem giving rise to the error, session information, information about applications associated with the error, network data, time of occurrence of the error, the end user's notes concerning the problem, or any other relevant data associated with the particular error. In other words, the error report 128 can serve as a snapshot of the system for providing support for correcting the source of the problem, and the information contained in the error report 128 can be used to quickly diagnose and resolve the problem. The error monitoring mechanism of the present disclosure can be configured to generate different types of error reports in accordance with specific requirements of various applications. For example, a Java Enterprise Edition (EE) Application, a proprietary web application user interface technology, or a portal framework may access the error handling mechanism of the present disclosure provided by web container 124 to extend the content of the error reports 128 based on application-specific requirements or features.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, example method 300 discusses the generation of a categorization ID for a detected problem, which may be implemented through an error report 128 or an error page that provides the end user an option to categorize a particular problem, report the problem, or search for similar problems. The error report may be reported to a support service along with all relevant data collected from the server and the categorization provided by the end user.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for causing one or more processors to monitor internal server errors, the method comprising the following steps performed by one or more processors:
    identify a generic internal server error notification representing an internal server error returned by a web container service executing at a web server, the internal server error associated with an internal categorization of internal server errors;
    increment a counter of a number of internal server errors returned by the web container service, the counter implemented in a web monitoring class in the web container service; and
    add occurrence of the internal server error to a categorization entry, the categorization entry generated based on the internal categorization of internal server errors, wherein the categorization entry is implemented in the web monitoring class in the web container service.

2. The method of claim 1, further comprising generating an error report of the internal server error.

3. The method of claim 2, wherein the error report comprises at least one of a value of the counter of the number of internal server errors returned by the web container service, the internal categorization of internal server errors, a source of the internal server error, or a possible solution to the internal server error.

4. The method of claim 2, wherein the error report is generated only if a previous error report associated with the internal categorization of internal server errors has not been generated.

5. The method of claim 1, wherein the counter is cleared after a predefined time.

6. The method of claim 1, wherein the categorization entry is cleared after a predefined time.

7. The method of claim 1, wherein adding the occurrence of the internal server error to the categorization entry comprises storing at least one of a categorization identifier of the internal server error generated based on the internal categorization of internal server errors, a number of occurrences of the internal server error, or a file name of an error report generated for the internal server error.

8. The method of claim 1, wherein the internal categorization of internal server errors is determined based on a particular attribute associated with the internal server errors.

9. The method of claim 8, wherein the particular attribute comprises at least one of a particular web publication, a message identification, or an associated component.

10. The method of claim 1, wherein the counter comprises an atomic variable and the categorization entry comprises a concurrent hash map data structure.

11. A computer program product encoded on a tangible storage medium, the product comprising computer readable instructions for causing one or more processors to perform operations comprising:
identify a generic internal server error notification representing an internal server error returned by a web container service executing at a web server, the internal server error associated with an internal categorization of internal server errors;
increment a counter of a number of internal server errors returned by the web container service, the counter implemented in a web monitoring class in the web container service; and
add occurrence of the internal server error to a categorization entry, the categorization entry generated based on the internal categorization of internal server errors, wherein the categorization entry is implemented in the web monitoring class in the web container service.

12. The computer program product of claim 11, further comprising generating an error report of the internal server error.

13. The computer program product of claim 12, wherein the error report comprises at least one of a value of the counter of the number of internal server errors returned by the web container service, the internal categorization of internal server errors, a source of the internal server error, or a possible solution to the internal server error.

14. The computer program product of claim 12, wherein the error report is generated only if a previous error report associated with the internal categorization of internal server errors has not been generated.

15. The computer program product of claim 11, wherein the counter is cleared after a predefined time.

16. The computer program product of claim 11, wherein the categorization entry is cleared after a predefined time.

17. The computer program product of claim 11, wherein adding the occurrence of the internal server error to the categorization entry comprises storing at least one of a categorization identifier of the internal server error generated based on the internal categorization of internal server errors, a number of occurrences of the internal server error, or a file name of an error report generated for the internal server error.

18. The computer program product of claim 11, wherein the internal categorization of internal server errors is determined based on a particular attribute associated with the internal server errors.

19. The computer program product of claim 11, wherein the particular attribute comprises at least one of a particular web publication, a message identification, or an associated component.

20. A system for monitoring internal server errors, comprising:
an internal categorization of internal server errors stored in memory, the internal server errors sharing a particular attribute;
an internal server error monitoring system, including a tangible computer readable medium storing instructions operable when executed by one or more processors to:
identify a generic internal server error notification representing an internal server error returned by a web container service executing at a web server, the internal server error associated with the internal categorization of internal server errors;
increment a counter of a number of internal server errors returned by the web container service, the counter implemented in a web monitoring class in the web container service; and
add occurrence of the internal server error to a categorization entry, the categorization entry generated based on the internal categorization of internal server errors, wherein the categorization entry is implemented in the web monitoring class in the web container service.

21. The system of claim 20, wherein the particular attribute comprises at least one of a particular web publication, a message identification, or an associated component.

* * * * *